United States Statutory Invention Registration [19]

[11] Reg. Number: H534

Graham [43] Published: Oct. 4, 1988

[54] LASER ENERGY ATTENUATION PAINT

[75] Inventor: Daniel D. Graham, Alamogordo, N. Mex.

[73] Assignee: The United States of America as represented by the Secretary of the Army, Washington, D.C.

[21] Appl. No.: 97,981

[22] Filed: Sep. 17, 1987

[51] Int. Cl.[4] ..... C08K 5/10; C08K 5/07; C08K 5/02

[52] U.S. Cl. ..... 524/315; 524/361; 524/364; 524/470; 524/555; 524/560

[58] Field of Search ..... 524/364

[56] References Cited

U.S. PATENT DOCUMENTS

| | | | |
|---|---|---|---|
| 3,853,783 | 12/1974 | Tucker | 540/131 |
| 4,009,364 | 2/1977 | Ladstadter . | |
| 4,581,259 | 4/1986 | Rambaud | 524/364 |
| 4,622,174 | 11/1986 | McKoy | 372/21 |
| 4,657,345 | 4/1987 | Gordon | 350/311 |
| 4,661,649 | 4/1987 | Reisfeld | 250/227 |

*Primary Examiner*—John F. Terapane
*Assistant Examiner*—Susan Wolffe
*Attorney, Agent, or Firm*—Saul Elbaum; Thomas E. McDonald; Alan J. Kennedy

[57] ABSTRACT

The present invention relates to a laser energy attenuation paint comprising a laser absorption dye in combination with a resin base in a solvent.

10 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LASER ENERGY ATTENUATION PAINT

BACKGROUND OF THE INVENTION

1. Field of the Invention

The present invention relates to a paint formulation which is effective in attenuating laser energy.

2. Description of the Prior Art

In the past laser beams have been used to cure paint coatings, among the many other uses for laser beams. In particular it has been found that the infrared radiation from a laser is effective in promoting the curing of paint coatings.

Attempts have been made in the past to attenuate laser energy in safety related applications. These applications have used solid plastic sheets of material impregnated with a laser absorption dye. However, solid plastic material has not proved to be satisfactory in many laser attenuation applications. The problems involved with the use of solid laser attenuation materials have included the inability of the solid material to adhere to surfaces other than flat surfaces, difficulties in application to large areas, and the fact that attenuation is only provided in large quantum steps. An example is an optical density of 16 or 160 db of attenuation. A need therefore continues to exist for a laser attentuation technique which overcomes the above described difficulties.

SUMMARY OF THE INVENTION

Accordingly, one object of the present invention is to provide a laser attenuation medium which is not encumbered with the problems of past and contemporary laser attenuation media, in that it is capable of being applied over large surface areas and on objects of widely varying shapes and sizes.

Briefly, this object and other objects of the present invention as hereinafter will become more readily apparent can be attained by a laser attenuation paint which is a laser attenuation dye in combination with a resin base in a solvent.

DETAILED DESCRIPTION OF THE PREFERRED EMBODIMENT

The discovery of the present invention is a laser energy attenuation paint (LEAP) which, when applied to a surface, dries into a hard thin film. The thickness of an applied layer of the present laser attenuation paint is a function of the extent of attenuation desired with the extent of attenuation being directly proportional to the thickness of the applied layer. Accordingly, any desired attenuation can be obtained by applying succeeding layers of laser attenuation paint to an object. Moreover, the laser attenuation paint can be so formulated that although laser energy is attenuated or absorbed, the paint is transparent to the visible region of the spectrum.

The LEAP formulation of the present invention can be easily applied to surfaces of any shape, and, in fact, can be combined with granular substances such as dust, sand, salt and the like to simultaneously achieve attenuation and diffusion by absorption of laser light.

The laser attenuation paint of the present invention is based on the discovery that the laser absorption dye used in laser guard materials can be dissolved in a solvent base, and when applied to a substrate, will effectively attenuate laser light. The essential criterion for the selection of a dye for use in the paint is that it must be compatible with the light from a specific laser. In other words, since the light from a given laser is of one particular wavelength, the absorption dye used must be of the color which is capable of attenuating that particular wavelength of laser light. Thus, in order to attenuate the light from a helium-neon or ruby laser, the dye of the paint must be a blue dye. For neodymium Yag and gallium arsenide lasers, a dark green dye must be used. For argon lasers, an orange/red dye must be used; and for a $CO_2$ laser, a clear paint may be employed. Other types of lasers would require a dye falling within these four basic colors.

The type of dye molecule which is used is not an important or critical consideration. Of course, it must be dissolvable in the solvent of the paint formulation. However, the dyes themselves are not limited to any particular one or several types of dye classes. The dye selected must only be of a color which is appropriate to absorb the light from a given laser.

In order to prepare the laser attenuation paint, the laser absorption dye, along with a resin, is dissolved in a solvent. The resin which is selected may be any type of thermoplastic material, with acrylic resins being the preferred resins. The resin, of course, should facilitate the laser light attenuation effect and certainly not detract from it.

The solvent which is employed to complete the paint formulation must dissolve the dye and resin components, and should be a relatively low boiling point material so as to evaporate from the applied paint. Suitable solvents include aliphatic ketones such as acetone, methylethylketone, or the like; halogenated hydrocarbons such as methylene chloride, chloroform, ethylene dichloride, and the like; esters such as methyl acetate, ethyl acetate, methyl propionate, and the like; and aromatic hydrocarbon compounds such as benzene, toluene, and the like. Combinations of these solvents may be employed, and, in fact, a preferred solvent system is a combination of acetone and methylene chloride.

The amounts of resin and laser dye which are incorporated in a paint formulation are not critical. The amount of dye incorporated in the paint should be such an amount that when a layer of paint is applied to a surface, an attenuation of laser light to an extent of one to several, preferably about 3 db is obtained. The amount of resin incorporated in the paint should be an amount sufficient to fix the laser dye on the painted surface, and to provide a sufficient coating of resin when a layer of paint is applied to a surface. Normally, the amount of laser absorption dye in the paint ranges from about 1% up to about 20%, and the amount of resin component may range from about 5% to 50%. The solvent, of course, comprises the remainder of the paint formulation.

If desired, the laser absorption paint can contain other paint additives such as carbon black, barium sulfate, calcium sulfate or the like. The four materials, when present, are used in customary amounts for paint formulations.

Once the laser attenuation paint of the invention is applied to a substrate, the paint dries rapidly, thereby leaving an effective laser light attenuating coating.

The laser attenuation paint of the present invention can be easily applied to many different types and shapes of substrates. LEAP inexpensively converts common transparent substances such as glass into attenuation filters or eye safety shields. Of more importance is the fact that curved surfaces such as lenses can be made to attenuate laser radiation. Another feature of LEAP is that it can be combined with granular or crystalline substances such that when it is applied to surfaces, it simultaneously affects attenuation, absorption and diffusion of light which greatly reduces the light reflected from a target. The present laser attenuation paint can conceivably be painted on a target to decrease the reflectance from a target designator which uses laser energy, thereby decreasing the range of a laser guided weapon.

Having generally described this invention, a further understanding can be obtained by reference to certain specific examples which are provided herein for purposes of illustration only and are not intended to be limiting unless otherwise specified.

A laser attenuation paint was prepared by dissolving 2 g of acrylic plastic sheet material, which contained green pigment, in a solvent of 6 fl. oz. of methylene chloride, acetone or ethylene dichloride. Six square pieces of glass were each coated with a different number of paint coatings so that the number of coatings on the glass pieces ranged from one to six. As the solvent evaporated after each coating, a thin film of pigment in resin remained. A separate glass piece was prepared which had no coating of LEAP. Using a 0.25 watt CW Yag GTE Sylvania model 605 laser and a EGG 580 radiometer, attenuated laser light was measured through each glass piece, and the following values were obtained. Each coating of paint provided about 3 db of attenuation.

| Number of LEAP Coatings on Glass Piece | Radiometer Value |
|---|---|
| 0 (clear) | $8 \times 10^{-9}$ |
| one | $3.7 \times 10^{-9}$ |
| two | $2.1 \times 10^{-9}$ |
| three | $0.5 \times 10^{-10}$ |
| four | $2.0 \times 10^{-10}$ |
| five | $1.0 \times 10^{-10}$ |

-continued

| Number of LEAP Coatings on Glass Piece | Radiometer Value |
|---|---|
| six | $0.5 \times 10^{-10}$ |

Having now fully described the invention, it will be apparent to one of ordinary skill in the art that many changes and modifications can be made thereto without departing from the spirit or scope of the invention as set forth herein.

What is claimed as new and is intended to be secured by Letters Patent is:

1. A laser energy attenuation paint, comprising:
a laser absorption dye in combination with a resin base in a solvent.

2. The laser energy attenuation paint of claim 1, wherein said solvent is an aliphatic ketone, a halogenated hydrocarbon, an ester, an aromatic hydrocarbon or mixtures thereof.

3. The laser energy attenuation paint of claim 2, wherein said solvent is acetone, methylene chloride and/or ethylene dichloride.

4. The laser energy attenuation paint of claim 3, wherein said solvent is a combination of acetone and methylene chloride.

5. The laser energy attenuation paint of claim 1, wherein said laser absorption dye is a dark blue dye, a dark green dye, a red dye or an orange dye, or combination thereof.

6. The laser energy absorption paint of claim 1, wherein the laser absorption dye is a dark blue dye which absorbs light from a helium-neon or ruby laser.

7. The laser energy absorption paint of claim 1, wherein the laser absorption dye is a dark green dye for gallium arsenide and neodymium Yag lasers.

8. The laser energy absorption paint of claim 1, wherein the laser absorption dye is an orange/red dye for argon lasers.

9. The laser energy absorption paint of claim 1, wherein said resin is a thermoplastic resin.

10. The laser energy absorption paint of claim 9, wherein said resin is a clear acrylic resin.

* * * * *